(12) United States Patent
Fujiwara

(10) Patent No.: US 11,203,300 B2
(45) Date of Patent: Dec. 21, 2021

(54) STORAGE DEVICE FOR VEHICLE

(71) Applicant: MORIROKU TECHNOLOGY COMPANY, LTD., Tokyo (JP)

(72) Inventor: Yuji Fujiwara, Tokyo (JP)

(73) Assignee: MORIROKU TECHNOLOGY COMPANY LTD., Tokyo (JP)

( * ) Notice: Subject to any disclaimer, the term of this patent is extended or adjusted under 35 U.S.C. 154(b) by 27 days.

(21) Appl. No.: 16/929,657

(22) Filed: Jul. 15, 2020

(65) Prior Publication Data
US 2021/0031698 A1 Feb. 4, 2021

(30) Foreign Application Priority Data
Jul. 30, 2019 (JP) .............................. JP2019-140095

(51) Int. Cl.
*B60R 7/04* (2006.01)
(52) U.S. Cl.
CPC ...................................... *B60R 7/04* (2013.01)
(58) Field of Classification Search
CPC ....................................................... B60R 7/04
USPC .................................... 296/24.34, 37.8, 153
See application file for complete search history.

(56) References Cited

U.S. PATENT DOCUMENTS

| | | | |
|---|---|---|---|
| 11,104,276 B2* | 8/2021 | Thomas | B60R 7/04 |
| 2007/0045332 A1* | 3/2007 | Kikuchi | B60R 7/04 220/830 |
| 2018/0304788 A1* | 10/2018 | Park | B60N 2/75 |

FOREIGN PATENT DOCUMENTS

JP 2002-331875 11/2002

* cited by examiner

*Primary Examiner* — D Glenn Dayoan
*Assistant Examiner* — E Turner Hicks
(74) *Attorney, Agent, or Firm* — Rankin, Hill & Clark LLP

(57) ABSTRACT

A storage device for a vehicle includes a storage portion main body capable of storing things therein, a lid swingably supported by the storage portion main body via a shaft member, a biasing member for biasing the lid in an opening direction, a first damper capable of damping a biasing force of the biasing member to a first transmission member, and a second damper capable of damping the biasing force of the biasing member to the second transmission member. The biasing force of the biasing member is set to a force that allows the lid to swing in the opening direction from a fully closed position to a predetermined open position, and stops a swinging motion of the lid when the lid is in the predetermined open position.

5 Claims, 7 Drawing Sheets

STORAGE DEVICE FOR VEHICLE

FIELD OF THE INVENTION

The present invention relates to a vehicle storage device that can store goods and belongings of a person or persons who exist in a vehicle.

BACKGROUND

Some vehicles are equipped with a vehicle storage device that is called a console and allows a person (or persons) in a vehicle to store his/her goods and belongings therein. As a prior art relating to the vehicle storage device, there is a technique disclosed in Japanese Patent Application Laid-Open Publication No. 2002-331875.

As shown in Japanese Patent Application Laid-Open Publication No. 2002-331875, the vehicle storage device includes a main body of a storage portion that is open in its upper face and can store things therein, a lid that is swingably supported in the main body of the storage portion and can open and close the opening of the upper face, a biasing member for biasing the lid in the opening direction, a rotary damper that is fixed to the main body of the storage portion, and a fan-shaped gear that can rotate with the lid, and meshes with the rotary damper when the lid is present between a predetermined open position and a fully open position.

When a lock of the lid in a closed state is released, a biasing force of the biasing member causes the lid to swing in the opening direction. When the swinging lid reaches a predetermined opening degree, the fan-shaped gear meshes with the rotary damper. The swinging motion of the lid is stopped by a damping force of the rotary damper. In the region where the damping force of the rotary damper is generated, it is possible to suppress rattling (shaky movements) of the lid.

SUMMARY OF THE INVENTION

In the vehicle storage device described in Japanese Patent Application Laid-Open Publication No. 2002-331875, upon releasing the lock from the closed state, the lid vigorously swings due to the biasing force of the biasing member. If the fan-shaped gear vigorously contacts the damper, contact noises may occur and/or the lid may swing in the closing direction due to reaction.

An object of the present invention is to provide a vehicle storage device having high merchantability.

According to an aspect of the present invention, there is provided a storage device for a vehicle, including:

a storage portion main body that is open in one face thereof and can store things therein;

a lid that is swingably supported by the storage portion main body through a shaft member, and can open and close at least a part of an opening of the storage portion main body;

a biasing member that biases the lid in an opening direction;

a first damper supported by one of the storage portion main body and the lid and configured to damp a biasing force of the biasing member;

a second damper supported by the above-mentioned one or the other of the storage portion main body and the lid and configured to damp the biasing force of the biasing member;

a first transmission member provided on either the storage portion main body or the lid such that the first transmission member is provided on the storage portion main body if the first damper is supported by the lid, whereas the first transmission member is provided on the lid if the first damper is supported by the storage portion main body, the first transmission member capable of transmitting the biasing force of the biasing member to the first damper when the lid is present between a fully closed position and a fully open position; and a second transmission member provided on either the storage portion main body or the lid such that the second transmission member is provided on the storage portion main body if the second damper is supported by the lid, whereas the second transmission member is provided on the lid if the second damper is supported by the storage portion main body, the second transmission member capable of transmitting the biasing force of the biasing member when the lid is present between a predetermined open position and the fully open position, the biasing force of the biasing member being set to a force that allows the lid to swing in the opening direction if the lid is present between the fully closed position and the predetermined open position, and that stops a swinging motion of the lid when the lid is present in the predetermined open position.

In the present invention, the biasing force of the biasing member is damped by the first damper connected to the first transmission member, and the biasing force of the biasing member is further damped when the second damper is connected to the second transmission member. In addition, the biasing force of the biasing member is set to a force that allows the lid to swing in the opening direction when the lid is between the fully closed position and the predetermined open position, and stops the swing motion of the lid when the lid is present in the predetermined open position. Therefore, it is possible to always generate a damping force by the first damper while the lid is swinging from the fully closed position to the fully open position. The second damper is connected to the second transmission member when the lid swings from the fully closed position to the predetermined open position due to the biasing force of the biasing member. Thus, it is possible to generate another (or an additional) damping force by the second damper, thereby stopping the swing motion of the lid, which is caused by the biasing force. From the predetermined open position to the fully open position, it is possible to swing the lid body by a hand of a person in the vehicle. When the person in the vehicle releases his/her hand from the lid between the predetermined open position and the fully open position, the lid is held in the released position. When the second damper is connected to the second transmission member, the damping force generated by the first damper can avoid or suppress vigorous contact (strong contact) between the second transmission member and the second damper. Because the two types of dampers are used, i.e., the first damper that can always generate a damping force and the second damper that can generate a damping force only until the lid reaches the full open position from the predetermined open position are used, it is possible to provide a vehicle storage device having excellent quietness and high merchantability.

DETAILED DESCRIPTION OF THE EMBODIMENTS

Figure 1:
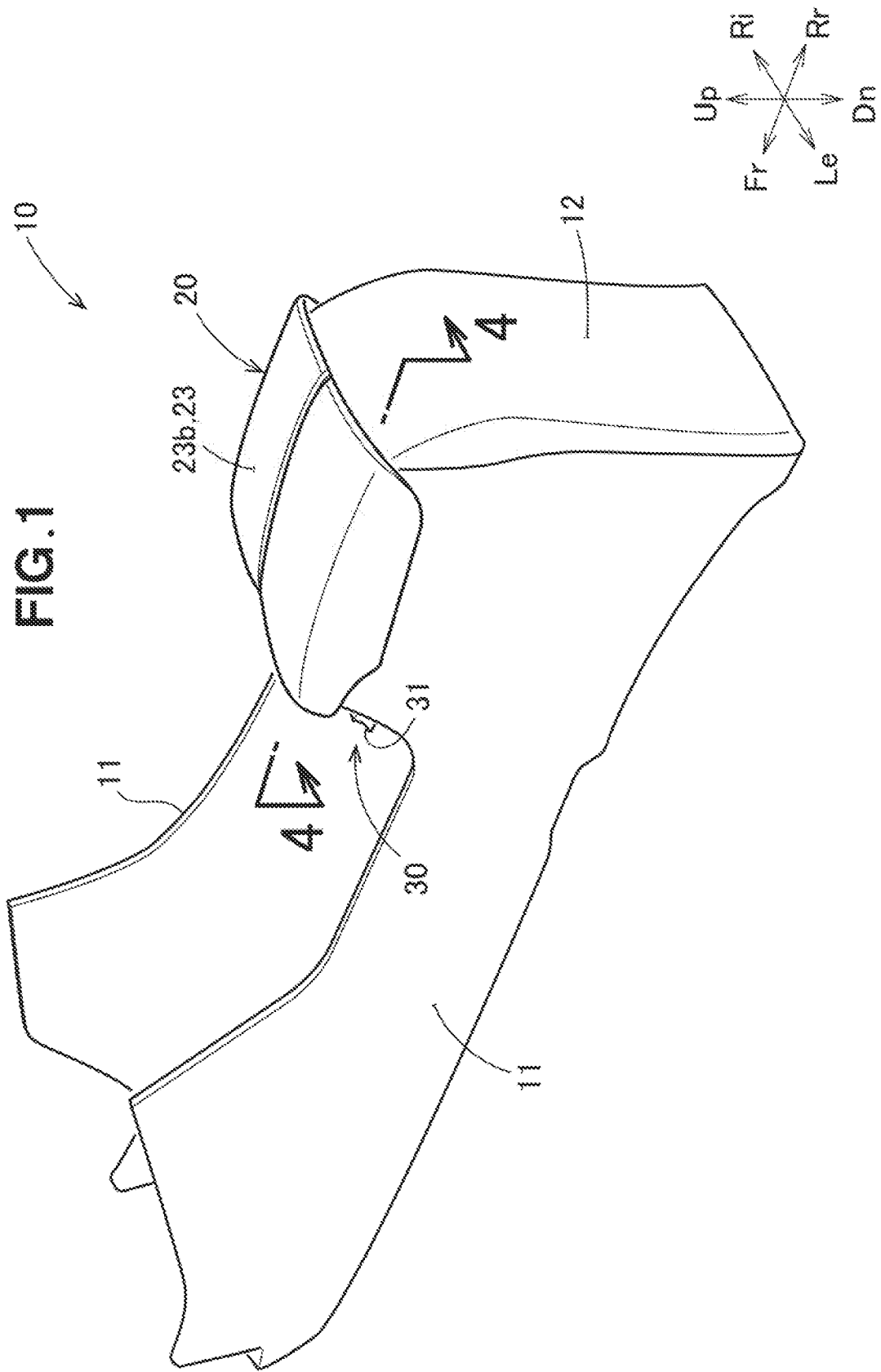
FIG. 1 is a perspective view of a vehicle storage device according to an embodiment of the invention.

Embodiments of the present invention will be described below with reference to the accompanying drawings. It should be noted that in the following description, the terms "left" and "right" refer to the left and right as viewed from a person in a vehicle, and the terms "front" and "rear" (or "back") refer to the front and rear as viewed in the traveling direction of the vehicle. In the drawings, "Fr" designates the front, "Rr" designates the rear, "Le" designates the left when viewed from the person in the vehicle, "Ri" designates the right when viewed from the person in the vehicle, "Up" designates top or upper, and "Dn" designates bottom or lower.

Referring to FIG. 1, a vehicle storage device 10 is applied, for example, to a console box in a vehicle. Such a vehicle storage device 10 is disposed in the front center of a vehicle interior (passenger's room or compartment of the vehicle) between the left and right front seats.

The vehicle storage device 10 includes a pair of side wall portions 11 and 11 extending rearward from the front end of the vehicle interior, a rear wall portion 12 connecting the rear ends of the two side wall portions 11 and 11 to each other, a storage portion 20 that is surrounded by the side wall portions 11 and 11 and the rear wall portion 12 and can store goods and belongings of a person (or persons) in the vehicle, and a lock mechanism 30 for keeping a lid 23 of the storage portion 20 in a closed state.

Figure 2:
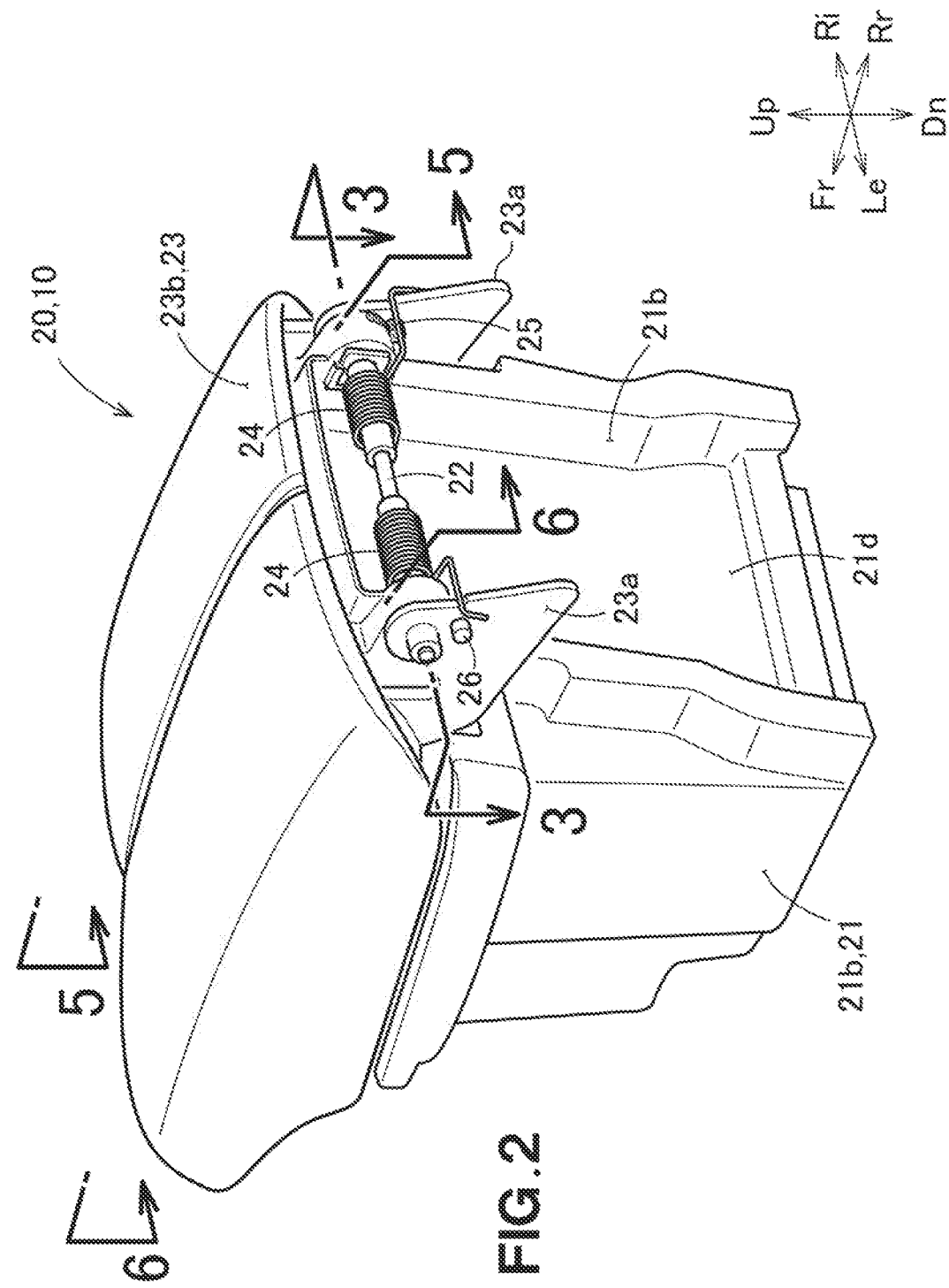
FIG. 2 is a perspective view showing a main part of the vehicle storage device shown in FIG. 1.
Figure 3:
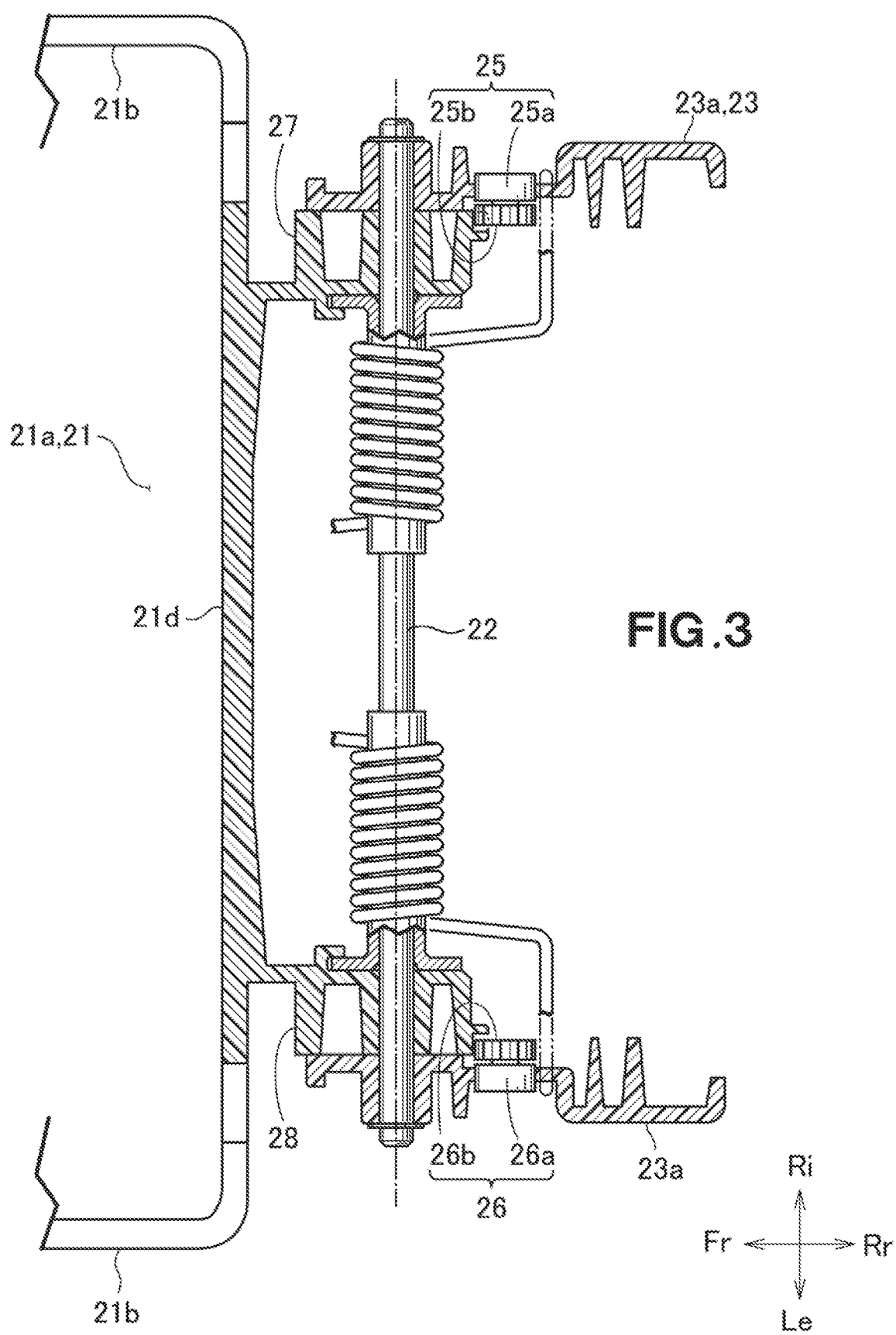
FIG. 3 is a cross-sectional view taken along the line 3-3 in FIG. 2.

Referring to FIG. 2 and FIG. 3, the storage portion 20 includes a storage portion main body 21 whose top is open and which can store things therein, a shaft member 22 which penetrates a rear portion of the storage portion main body 21 in the right-left direction (lateral direction), a lid 23 which is swingably supported by the storage portion main body 21 through the shaft member 22, two coil springs 24, 24 (biasing members 24, 24) which are provided on the shaft member 22 to bias the lid 23 in the opening direction, a first damper 25 which is supported by a right rear portion of the lid 23 and can damp the biasing forces of the coil springs 24, 24, a second damper 26 which is supported by a left rear portion of the lid 23 and can damp the biasing forces of the coil springs 24, 24, a first transmission member 27 which is integrally formed in the right rear portion of the storage portion main body 21 and can transmit the biasing forces of the coil springs 24, 24 to the first damper 25, and a second transmission member 28 which is integrally formed on the left rear portion of the storage portion main body 21 and can transmit the biasing forces of the coil springs 24, 24 to the second damper 26.

Figure 4:
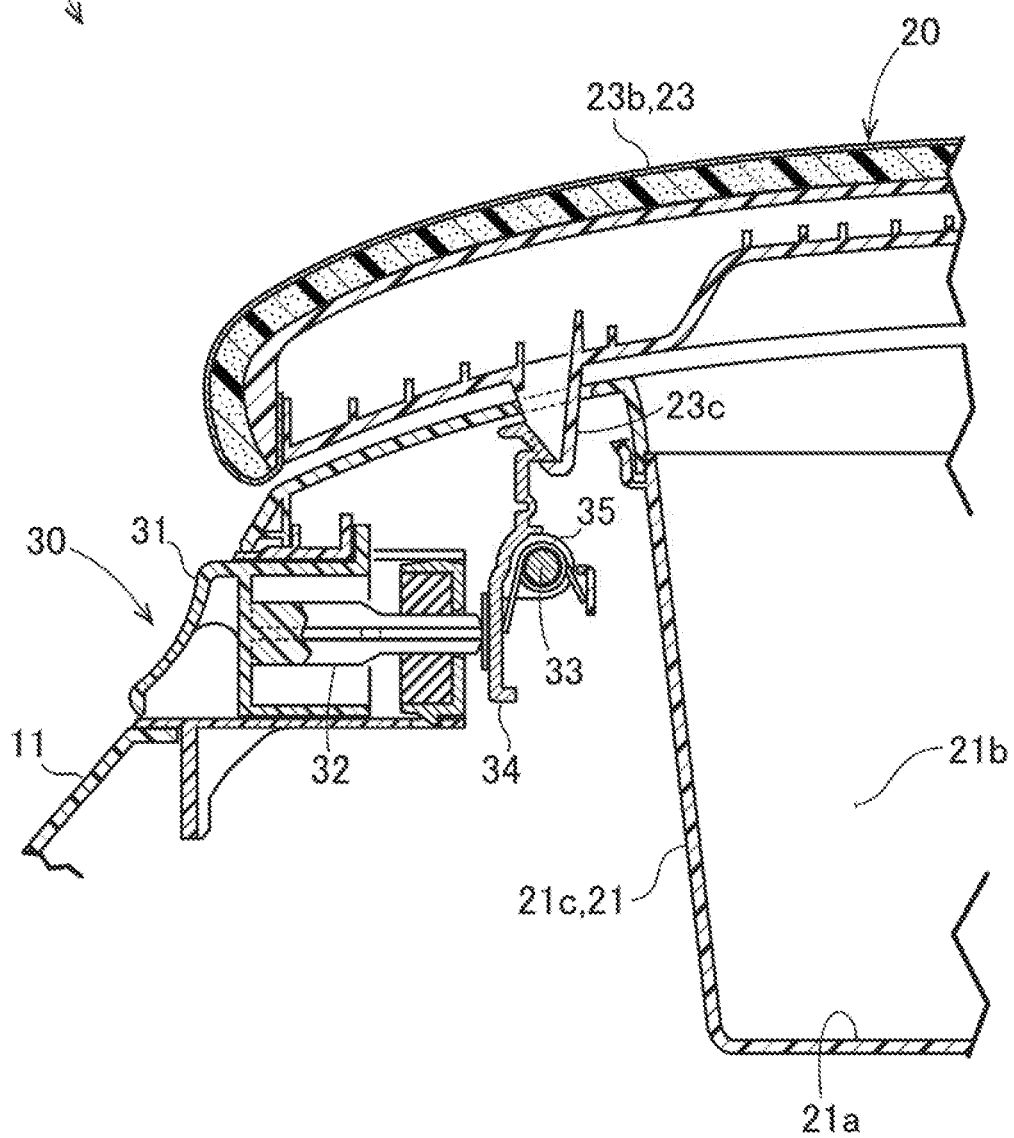
FIG. 4 is a cross-sectional view taken along the line 4-4 in FIG. 1.
Figure 4:
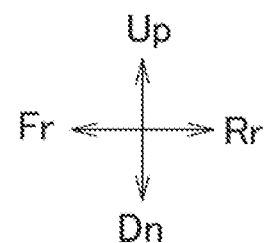

Referring to FIG. 4, a locking mechanism 30 includes a button 31 which is supported by the side wall portion 11 and pressed by a person in the vehicle to unlock the locking mechanism, a rod portion 32 which is integrally formed on the button 31 and extends rearward from the button 31, a rod-shaped lock shaft portion 33 provided behind the rod portion 32, a swing plate portion 34 which is swingably supported by the lock shaft portion 33 and whose upper end is engaged with the lid 23, and a lock spring portion 35 which is fixed to the lock shaft portion 33 and biases the swing plate portion 34 toward the rod portion 32.

For example, a resin molded article is used for the main body 21 of the storage portion. Referring also to FIG. 3, the main body 21 of the storage portion includes a main body bottom portion 21a located at the bottom of the main body 21, main body side wall portions 21b, 21b which respectively stand from the left and right sides (edges) of the main body bottom portion 21a, a main body front wall portion 21c which stands from the main body bottom portion 21a and connects the front ends of the main body side wall portions 21b, 21b to each other, and a main body rear wall portion 21d which stands from the main body bottom portion 21a and connects the rear ends of the main body side wall portions 21b, 21b to each other.

The shaft member 22 is a round bar-shaped member supported by the storage portion main body 21 via the first transmission member 27 and the second transmission member 28. The shaft member 22 extends through the first transmission member 27, the second transmission member 28 and the lid 23.

Referring to FIG. 2, the lid 23 has left and right lid hinge portions 23a, 23a which are swingably supported by the shaft member 22, and a lid main body 23b which is integrally formed with the front portions of the lid hinge portions 23a, 23a and can cover (close) the opening of the storage portion main body 21.

Referring to FIG. 4, the lid 23 also has a lid claw portion 23c which can engage with the swing plate portion 34 and is formed in a claw shape. The lid claw portion 23c is integrally formed on the lid main body 23b.

Referring to FIG. 2, the coil springs 24, 24 may be constructed by a single member. Alternatively, the coil springs 24, 24 may be constructed by three or more separate members. Alternatively, even a member other than the coil spring may be used as the biasing member as long as the member can urge the lid 23 in the opening direction.

Figure 5:
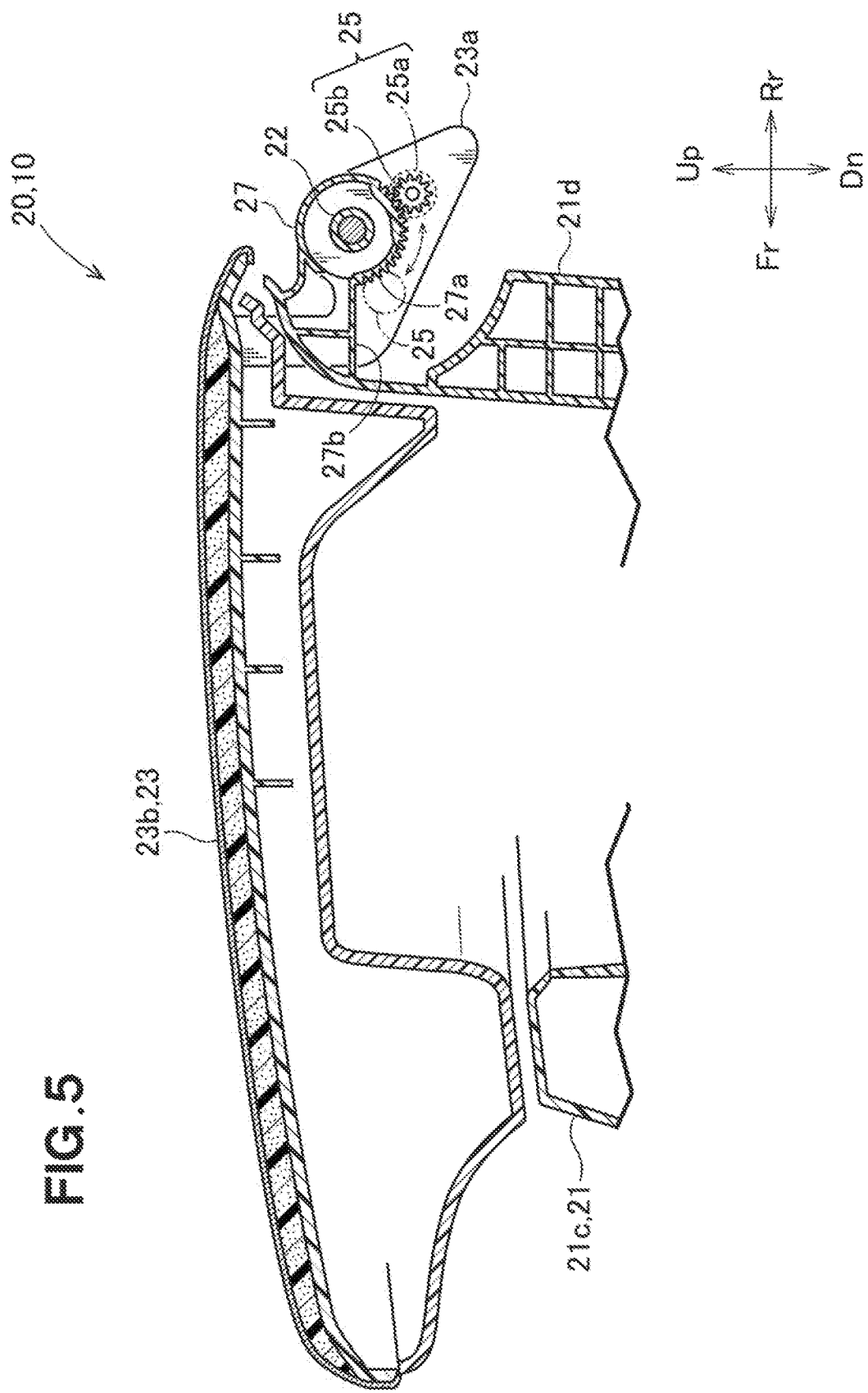
FIG. 5 is a cross-sectional view taken along the line 5-5 in FIG. 2.

Referring to FIG. 3 and FIG. 5, the first damper 25 is constituted by a rotary damper. The first damper 25 has a first damper main body portion 25a fixed to the right lid hinge portion 23a, with the interior of the main body portion 25a being filled with oil. The first damper 25 also has a first damper gear portion 25b, which is a gear rotatably supported by the first damper main body portion 25a and meshes with the first transmission member 27.

The first damper gear portion 25b is located between the left lid hinge portion 23a and the right lid hinge portion 23a. The first damper 25 rotates about the shaft member 22 as the lid 23 rotates from the fully closed position to the fully open position. As shown in FIG. 5, when the lid 23 swings to the fully open position, the first damper 25 rotates to a position indicated by a two-dot chain line.

It should be noted that in the state shown in FIG. 5, the lid 23 is located in the fully closed position.

Figure 6:
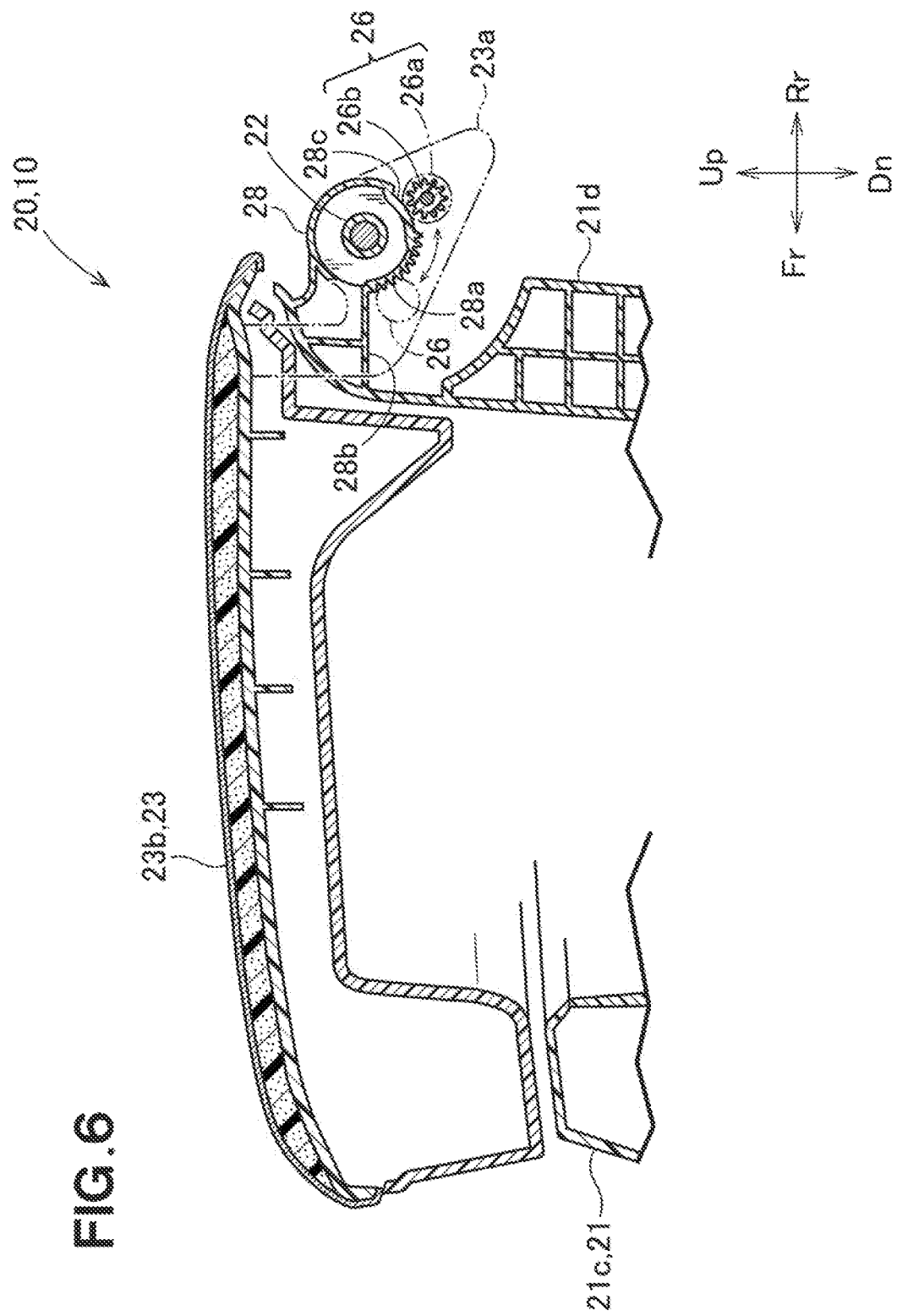
FIG. 6 is a cross-sectional view taken along the line 6-6 in FIG. 2.

Referring to FIG. 3 and FIG. 6, the second damper 26 is constituted by a rotary damper. The second damper 26 has a second damper main body portion 26a which is fixed to the left lid hinge portion 23a, with the interior of the main body portion 26a being filled with oil. The second damper 26 also has a second damper gear portion 26b, which is a gear rotatably supported by the second damper body portion 26a and meshes with the second transmission member 28.

The second damper gear portion 26b is located between the left lid hinge portion 23a and the right lid hinge portion 23a. The second damper 26 rotates about the shaft member 22 as the lid 23 rotates from the fully closed position to the fully open position. As shown in FIG. 6, when the lid 23 swings to the fully open position, the second damper 26 rotates to a position indicated by a two-dot chain line.

It should be noted that in the state shown in FIG. 6, the lid 23 is located in the fully closed position.

Referring to FIG. 5, the first transmission member 27 is situated behind the main body rear wall portion 21d and integrally formed with the storage portion main body 21. The first transmission member 27 is located between the left lid hinge portion 23a and the right lid hinge portion 23a. In other words, the side surfaces of the first damper 25 and the first transmission member 27 are covered with the left and right lid hinge portions 23a, 23a.

The first transmission member 27 has a first transmission member gear portion 27a which has a gear shape and is formed so as to mesh with the first damper gear portion 25b. The first transmission member 27 is connected to the main body rear wall portion 21d through a first rib 27b.

The first transmission member gear portion 27a is formed along the track (movement path) of the first damper 25. The first transmission member gear portion 27a extends along the movement region of the first damper 25 such that the first transmission member gear portion 27a meshes with the first damper gear portion 25b from a state where the lid 23 is positioned in the fully closed position to a state where the lid 23 reaches the fully open position.

Referring to FIG. 6, the second transmission member 28 is situated behind the main body rear wall portion 21d and integrally formed in the storage portion main body 21. The second transmission member 28 is located between the left lid hinge portion 23a and the right lid hinge portion 23a. In other words, the side surfaces of the second damper 26 and the second transmission member 28 are covered with the left and right lid hinge portions 23a, 23a.

The second transmission member 28 has a second transmission member gear portion 28a which has a gear shape and is formed so as to mesh with the second damper gear portion 26b. The second transmission member 28 is connected to the rear wall portion 21d of the main body via a second rib 28b.

The second transmission member gear portion 28a is formed along the track of the second damper 26. The second transmission member gear portion 28a extends along the movement region of the second damper 26 such that the second transmission member gear portion 28a meshes with the second damper gear portion 26b from a state where the lid 23 is positioned at a predetermined open position to a state where the lid 23 reaches the fully open position. The predetermined open position of the lid 23 will be described later.

Referring also to FIG. 5, if the region where the first damper gear portion 25b is formed with respect to the first transmission member 27 is compared with the region where the second damper gear portion 26b is formed with respect to the second transmission member 28, the region where the first damper gear portion 25b is formed is wider. Therefore, in a certain portion of the region where the first damper gear portion 25b meshes with the first transmission member gear portion 27a, the second damper gear portion 26b does not mesh with the second transmission member gear portion 28a. This "certain portion" is referred to as a non-transmitting portion 28c in which the biasing forces of the coil springs 24, 24 (see FIG. 3) are not transmitted. The non-transmitting portion 28c extends from a position corresponding to the fully closed position of the lid 23 to a position corresponding to a predetermined open position. That is, from the fully closed position of the lid 23 to the predetermined open position of the lid 23, the second damper 26 does not generate a damping force.

The operation of the above-described storage device 10 for the vehicle will now be described.

Referring to FIG. 4, as a person in the vehicle presses the button 31 backward, the rod portion 32 retracts (moves rearward) with the button 31. As the rod portion 32 retracts, the lower part of the swing plate portion 34 swings backward about the lock shaft portion 33. At this time, the upper part of the swing plate portion 34 swings forward about the lock shaft portion 33. As the upper part of the swing plate portion 34 swings forward, the locked state between the swing plate portion 34 and the lid claw portion 23c is released. The lid 23 swings upward because the lid 23 is biased in the opening direction by the coil springs 24, 24 (see FIG. 3).

Referring to FIG. 5, when the lid 23 swings upward, the first damper 25 also rotates about the shaft member 22. At this time, because the first damper gear portion 25b meshes with the first transmission member gear portion 27a, the first damper gear portion 25b is caused to rotate. As the first damper gear portion 25b rotates, the first damper 25 generates a damping force. This damping force becomes a resistance to the force that attempts to cause the lid 23 to swing in the opening direction.

Here, the biasing forces of the coil springs 24 and 24 (see FIG. 3) are greater than the damping force generated by the first damper 25. Therefore, the lid 23 swings in the opening direction while generating the damping force.

Figure 7A:
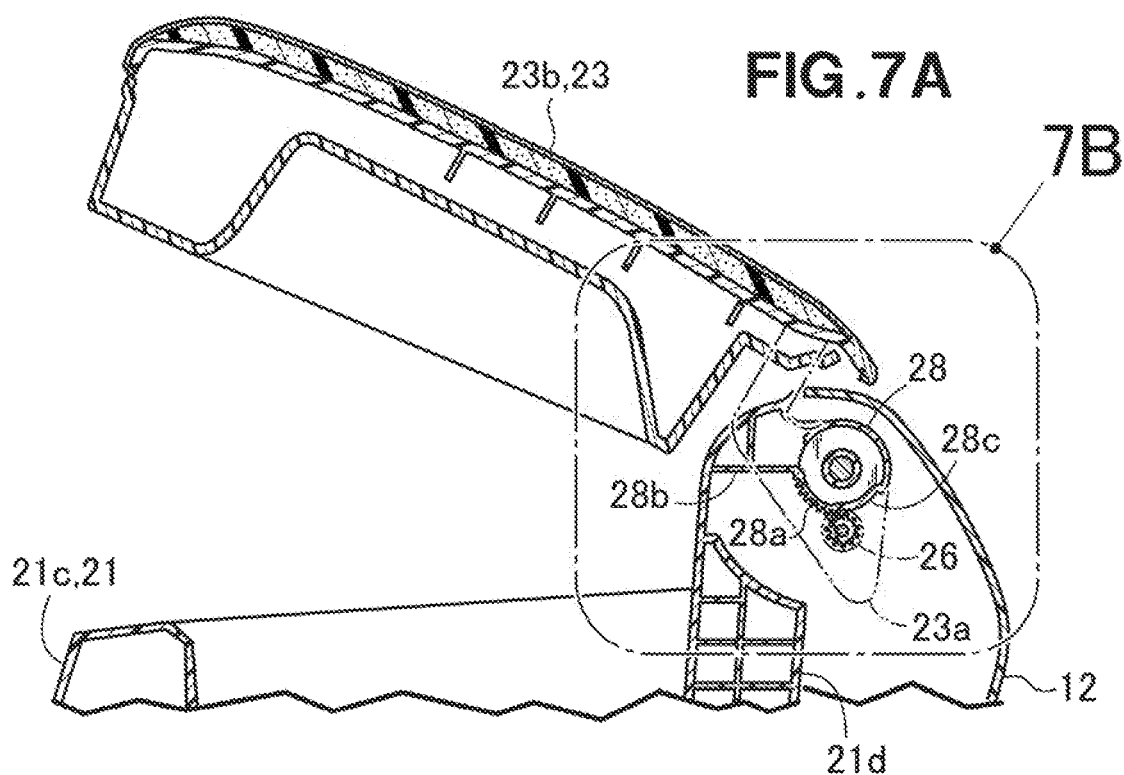
FIG. 7A is a diagram useful to describe the vehicle storage when a lid is positioned at a predetermined open position.
Figure 7B:
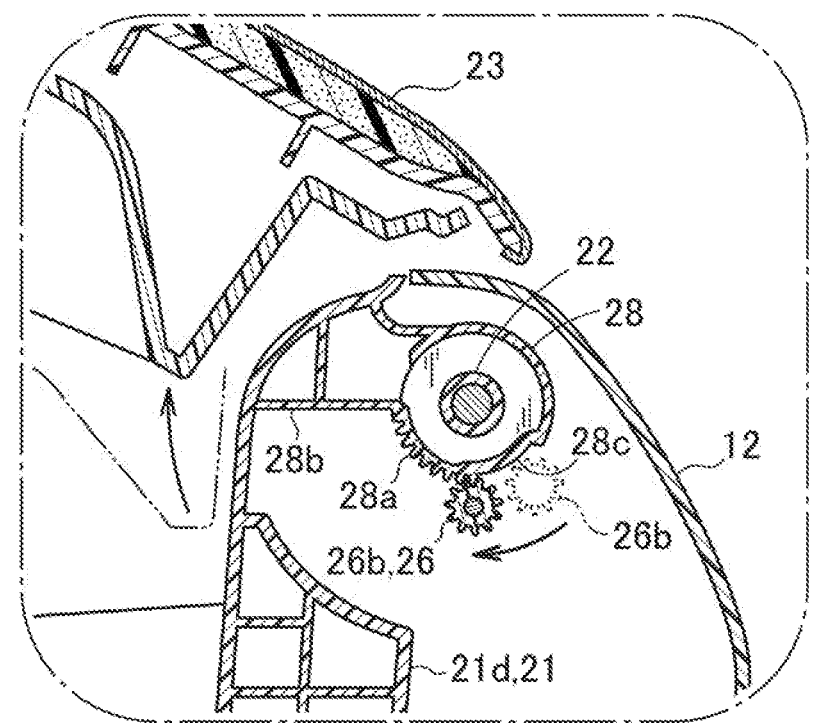
FIG. 7B is an enlarged view of a portion 7B in FIG. 7A.

Referring to FIG. 7A and FIG. 7B, when the lid 23 swings to the predetermined open position, the second damper gear portion 26b meshes with the second transmission member gear portion 28a. Because a force acts in the rotating direction of the second damper gear portion 26b, the second damper 26 generates a damping force. Thus, the lid 23 stops at the predetermined open position. In other words, the biasing forces of the coil springs 24, 24 are set to forces that stop the swinging motion of the lid 23 when the lid is in the predetermined open position.

It is possible to cause the lid 23 to swing from the predetermined open position to the fully open position by a hand of the person in the vehicle. If the person in the vehicle releases his/her hand from the lid 23 between the predetermined open position and the fully open position, the lid 23 is held in a released position (the lid is held in a self-supporting manner).

When closing the opening of the storage portion main body 21, the person in the vehicle causes the lid 23 to swing to the fully closed position. As shown in FIG. 4, the lid claw portion 23c engages with the swing plate portion 34 (claw portion 23c hooks on the plate portion 34), and the lid 23 is held in the fully closed position.

The above-described vehicle storage device 10 achieves the following advantages.

The vehicle storage device 10 can damp the biasing forces of the coil springs 24, 24 by the first damper 25 connected (coupled) to the first transmission member 27. The vehicle storage device 10 can further damp the biasing forces of the coil springs 24, 24 when the second damper 26 is connected to the second transmission member 28. In addition, the biasing forces of the coil springs 24, 24 are set such that the lid 23 can swing in the opening direction from the fully closed position to the predetermined open position and such that the swinging motion of the lid 23 stops at the predetermined open position. Therefore, while the lid 23 is swinging, it is possible to always generate a damping force by the first damper 25 from the fully closed position to the fully open position. The second damper 26 is coupled to the second transmission member 28 if the lid 23 swings, due to the biasing forces of the coil springs 24, 24, from the fully closed position to the predetermined open position. Thus, the second damper 26 can also generate a damping force, and it is possible to stop the swinging motion of the lid 23 caused by the biasing forces. When the second damper 26 is coupled to the second transmission member 28, the damping force generated by the first damper 25 can avoid or suppress the possibility that the second transmission member 28 and the second damper 26 contact vigorously with each other. Because the two types of dampers are used, i.e., the first damper 25 capable of always generating a damping force and the second damper 26 capable of generating an additional damping force only until the lid 23 reaches the full open position from the predetermined open position are used, it is possible to provide the vehicle storage device 10 having excellent quietness and high merchantability.

The second transmission member 28 has the second transmission member gear portion 28*a* which meshes with the second damper 26 as the lid 23 moves from the predetermined open position to the fully open position. In other words, the second damper 26 is coupled to the second transmission member 28 through the gear. It is easy to set (or change) the predetermined open position by appropriately deciding the range (realm) in which the gear is formed.

The first transmission member 27 and the second transmission member 28 are integrally formed with the storage portion main body 21. The first damper 25 and the second damper 26 are supported by the lid 23. Because the first transmission member 27 and the second transmission member 28 are integrally formed with the storage portion main body 21, which is a stationary element, it is possible to further increase the strength of the first transmission member and the second transmission member. Because the strength of the first transmission member 27 is enhanced and the strength of the second transmission member 28 is enhanced, it is possible to more reliably generate the damping force from the first damper 25 and the damping force from the second damper 26.

In addition, the main body rear wall portion 21*d* (wall portion 21*d*) of the storage portion main body 21 is connected to the first transmission member 27 by the first rib 27*b*. Further, the main body rear wall portion 21*d* (wall portion 21*d*) of the storage portion main body 21 is connected to the second transmission member 28 by the second rib 28*b*. Thus, it is possible to increase the strength (rigidity) of the first transmission member 27 and the second transmission member 28.

Furthermore, the lid 23 extends toward the shaft member 22 from the lid main body 23*b*, which opens and closes the opening of the storage portion main body 21, and has a pair of lid hinge portions 23*a*, 23*a* through which the shaft member 22 penetrates. The first damper 25, the second damper 26, the first transmission member 27, and the second transmission member 28 are located between these two lid hinge portions 23*a*, 23*a*. Because the lid hinge portions 23*a*, 23*a* cover the above-mentioned members, it is possible increase the design property (value of the design) of the storage device and enhance the protective property of the storage device.

It should be noted that although the storage device for the vehicle according to the embodiment of the present invention has been described based on the example applied to the console box, the storage device can be applied to a glove compartment (compartment on a dashboard of the vehicle) or the like, i.e., the application of the present invention is not limited to the described or illustrated configurations. It should also be noted that depending upon the site to which the storage device is applied, the opening of the storage device main body may be formed in the rear face, the front face or the side of the storage device main body.

The first damper and the second damper may employ rotary dampers having different characteristics or a rotary damper having the same characteristics. When the first damper and the second damper employ the rotary dampers having different characteristic, the damping force generated by the first damper can be set to a value different from the damping force generated by the second damper. For example, it is possible to employ a rotary damper which generates a large damping force for the second damper. Thus, it is possible to increase the degree of freedom of design.

Further, the first damper and the second damper may be supported by the storage portion main body. In this configuration, the first transmission member and the second transmission member are provided on the lid. Furthermore, one of the first damper and the second damper may be provided on the storage portion main body, and the other may be provided on the lid. In this configuration, if the first damper is provided on one of the storage portion main body and the lid, the first transmission member is provided on the other. If the second damper is provided on one of the storage portion main body and the lid, the second transmission member is provided on the other.

As long as the operation and advantages of the present invention are achieved, the present invention is not limited to the embodiments.

What is claimed is:

1. A storage device for a vehicle, comprising:
   a storage portion main body that is open in one face thereof and can store things therein;
   a lid that is swingably supported by the storage portion main body through a shaft member, and can open and close at least a part of an opening of the storage portion main body;
   a biasing member that biases the lid in an opening direction;
   a first damper supported by one of the storage portion main body and the lid and configured to damp a biasing force of the biasing member;
   a second damper supported by said one or the other of the storage portion main body and the lid and configured to damp the biasing force of the biasing member;
   a first transmission member provided on either the storage portion main body or the lid such that the first transmission member is provided on the storage portion main body if the first damper is supported by the lid, whereas the first transmission member is provided on the lid if the first damper is supported by the storage portion main body, the first transmission member capable of transmitting the biasing force of the biasing member to the first damper when the lid is present between a fully closed position and a fully open position; and
   a second transmission member provided on either the storage portion main body or the lid such that the second transmission member is provided on the storage portion main body if the second damper is supported by the lid, whereas the second transmission member is provided on the lid if the second damper is supported by the storage portion main body, the second transmission member capable of transmitting the biasing force of the biasing member to the second damper when the lid is present between a predetermined open position and the fully open position, the biasing force of the biasing member being set to a force that allows the lid to swing in the opening direction if the lid is present between the fully closed position and the predetermined open position, and that stops a swinging motion of the lid when the lid is present in the predetermined open position.

2. The storage device for the vehicle according to claim 1, wherein the second transmission member comprises a second transmission member gear portion which meshes with the second damper when the lid is present between the predetermined open position and the fully open position.

3. The storage device for the vehicle according to claim 1, wherein the first transmission member and the second transmission member are integrally formed with the storage portion main body, and the first damper and the second damper are supported by the lid.

4. The storage device for the vehicle according to claim 2, wherein the second transmission member comprises a non-transmitting portion that cannot transmit a damping force of the second damper when the lid is present between the fully closed position and the predetermined open position.

5. The storage device for the vehicle according to claim 1, wherein the lid is held in a self-supporting manner when the lid is present between the predetermined open position and the fully open position.

* * * * *